ium Patented Nov. 19, 1957

2,813,865
MERCURY DERIVATIVES OF 1,6,8-TRIAZABICY-CLO[4,3,0]NONANE-7,9-DIONE, 8-SUBSTITUTED DERIVATIVES THEREOF, AND PREPARATION THEREOF

Robert L. Clarke, Elsmere, and Franklyn W. Gubitz, East Greenbush, N. Y., assignors to Sterling Drug Inc., New York, N. Y., a corporation of Delaware No Drawing. Application June 10, 1955,
Serial No. 514,687

18 Claims. (Cl. 260—242)

This invention relates to mercury derivatives of 1,6,8-triazabicyclo[4,3,0]nonane-7,9-dione and N-substituted derivatives thereof, and to processes for preparing them. More particularly the invention relates to 8-R-3-R'Hg-4-R''O-1,6,8-triazabicyclo[4,3,0]nonane-7,9-diones, wherein R is hydrogen, an alkali metal or the residue of an alkylating agent having a molecular weight less than about 300, R' is an anion, R'' is hydrogen or a lower-alkyl, hydroxy-lower-alkyl, lower-alkoxy-lower-alkyl, or a hydroxy-lower-alkoxy-lower-alkyl group.

A preferred aspect of the invention relates to compounds having the formula

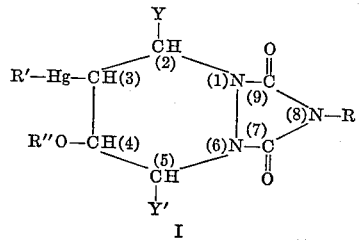

wherein R, R' and R'' have the meanings given above, and Y and Y' are hydrogen or lower-alkyl groups.

Pharmacological evaluation of the compounds of the invention has demonstrated that these substances possess diuretic activity when administered to dogs at non-toxic and non-irritating dose levels, thus indicating their usefulness in relieving edematous conditions and in treatment of certain types of nephritis and heart disease wherein increased elimination of fluid and of sodium ion is desirable. The compounds can be administered intramuscularly, subcutaneously or orally, either per se or in combination with other diuretic substances such as theophylline. For parenteral use, the compounds are used in the form of an aqueous solution or suspension. For oral use, the compounds can be combined with conventional excipients and administered in tablet or capsule form.

The group R in the above general Formula I represents hydrogen, an alkali metal or the residue of an alkylating agent RX wherein X is a negative radical derived from a strong acid. The nature of the group R is not critical provided it is of relatively low molecular weight, less than about 300. Illustrative of the group R, when it represents the residue of an alkylating agent, are alkyl groups, cycloalkyl groups, cycloalkylalkyl groups, and monocarbocyclic aryl-lower-alkyl groups, and such groups substituted by from one to three hydroxy, carboxy or carboalkoxy groups. The group R preferably has less than about 15 carbon atoms. Thus R can be such groups as methyl, ethyl, propyl, isopropyl, butyl, isobutyl, pentyl, hexyl, octyl, decyl, dodecyl, pentadecyl, cyclopropyl, cyclobutyl, cyclopentyl, cyclohexyl, 4-methylcyclohexyl, cycloheptyl, cyclopentylmethyl, 2-cyclohexylethyl, 4-methylcyclohexylethyl, benzyl, 2-phenylethyl, 5-phenylpentyl, carboxymethyl, carbethoxymethyl, 2-hydroxyethyl, 2,3-dihydroxypropyl, 2-hydroxy-3-carboxypropyl, tris(hydroxymethyl)methyl, and the like. The aryl groups of the monocarbocyclic aryl-lower-alkyl groups can also contain other substituents inert under the conditions of the preparation of the compounds, viz. nitro, halogen, alkyl, alkoxy, trifluoromethyl, and the like.

A preferred class of the group R comprises hydrogen, alkali metals, lower-alkyl groups, and lower-alkyl groups substituted by from 1 to 3 hydroxy, carboxy or carbo-lower-alkoxy groups. The lower-alkyl groups can be straight or branched and contain from 1 to about 6 carbon atoms. Thus the preferred class of the group R includes such groups as methyl, ethyl, propyl, isopropyl, butyl, isobutyl, pentyl, hexyl, isohexyl, carboxymethyl, carbethoxymethyl, 2-hydroxyethyl, 2,3-dihydroxypropyl, 2-hydroxy-3-carboxypropyl, tris(hydroxymethyl)methyl, and the like.

In the above general Formula I the group R' represents an anion. Thus R can be the hdroxyl anion or an anion derived from a substance R'H wherein H is an acidic hydrogen, including inorganic acids, organic carboxylic and sulfonic acids, phenols, mercaptans, and acidic nitrogen compounds, such as succinimide, phthalimide, theophylline and the like. A preferred class of anions is selected from non-toxic inorganic anions, lower-alkanoyloxy groups and lower-alkylmercapto groups, and said lower-alkanoyloxy and alkylmercapto groups substituted by groups selected from hydroxy, carboxy, carboalkoxy and amino. The lower-alkanoyloxy and lower-alkylmercapto groups can be straight or branched and contain from 1 to about 6 carbon atoms. Thus the group R' includes such groups as hydroxyl, halide (including chloride, bromide and iodide), nitrate, sulfate, thiosulfate, phosphate, acetoxy, propionoxy, butyroxy, methylmercapto, carboxymethylmercapto, carbethoxymethylmercapto, 2-hydroxyethylmercapto, aminoethylmercapto, propylmercapto, isopropylmercapto, 2-amino-3-carboxypropylmercapto, hydroxyacetoxy, and the like.

The group R'' in the above general Formula I represents hydrogen or the residue of a lower-alkanol, glycol or hydroxy ether. R'' thus stands for hydrogen, lower-alkyl, hydroxy-lower-alkyl, lower-alkoxy-lower-alkyl, or hydroxy-lower-alkoxy-lower-alkyl. The groups can be straight or branched and contain from 1 to about 6 carbon atoms, thus including such groups as methyl, ethyl, propyl, isopropyl, butyl, isobutyl, pentyl, hexyl, isohexyl, 2-hydroxyethyl, 3-hydroxypropyl, 2-ethoxyethyl, 2-propoxyethyl, 2-(2-hydroxyethoxy)ethyl, and the like.

In the above general Formula I, the groups Y and Y' represent hydrogen atoms or lower-alkyl groups. The groups Y and Y' can be the same or different, although it is preferred that they be the same in order to prevent the formation of mixtures upon mercuration of the unsaturated intermediates of Formula II below. When Y and/or Y' are lower-alkyl groups they can be straight or branched and have from one to about four carbon atoms, thus including such groups as methyl, ethyl, propyl, isopropyl, butyl, isobutyl and tertiary-butyl.

The compounds of Formula I are prepared by reacting a compound having the formula

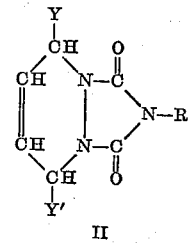

wherein R is hydrogen or the residue of an alkylating agent, and Y and Y' have the meanings given above, with a mercuric salt and a member of the group consisting of water, lower-alkanols, hydroxy-lower-alkanols, lower-alkoxy-lower-alkanols, and hydroxy-lower-alkoxy-lower-alkanols, said mercuric salt being at least partially soluble in the reaction medium. In the compounds of Formula I thus produced, the group R' is the anion derived from the mercuric salt used, and the group R" is derived from the solvent used, being hydrogen if water is used or an aliphatic group if an alcohol is used. A preferred mercuric salt is mercuric acetate and a preferred solvent is methanol, thus giving the compounds of Formula I wherein R' is acetoxy and R" is methyl. Under preferred conditions the reaction is carried out at a temperature between about 20° C. and 150° C. The reaction is completed within the course of a few hours if a trace of an oxidizing agent, such as nitric acid, hydrogen peroxide or an organic peroxide, is added as a catalyst, although the reaction occurs without the catalyst if the reactants are heated together for a more extended period of time.

The compounds of Formula I wherein R' is hydroxyl are prepared by hydrolysis of the compounds where R' is an anion derived from an acid R'H, for example, acetoxy, preferably in the presence of an alkali metal hydroxide. The compounds wherein R' is hydroxyl then can be reacted, if desired, with any acid R'H to introduce any desired anion.

Alternatively, it is often possible to change one anion R' to another by double decomposition reactions, provided the proper solubility relationships are present. For example, a compound of Formula I wherein R' is acetoxy is relatively water and alcohol soluble and can be reacted with an alkali metal halide in aqueous or aqueous-alcoholic solution to give the corresponding compound of Formula I wherein R' is halogen, which compound is relatively insoluble in water and alcohol and precipitates from solution.

In the reaction of a compound of Formula I wherein R' is hydroxyl with a compound R'H, wherein the hydrogen depicted is acidic in character, to replace the hydroxyl group by the anion R', it is desirable to neutralize any acidic groups present in the reactants other than the acidic group which is to be reacted with the hydroxyl group, in order to prevent side reactions and the formation of mixtures. For example, in the reaction of 3-hydroxymercuri-4-methoxy - 1,6,8-triazabicyclo[4,3,0]nonane-7,9-dione [I; R=H, R'=OH, R"=CH₃, Y and Y'=H] with thiomalic acid [HOOCCH₂CH(COOH)SH], three molar equivalents of sodium hydroxide are added to neutralize the imido hydrogen and the two carboxyl groups of the thiomalic acid. The sulfhydryl group, being less acidic than the imido hydrogen or the carboxyl groups, is left free to react with the hydroxyl group to give 3-(1,2-dicarboxyethylthiomercuri)-4-methoxy - 1,6,8-triazabicyclo-[4,3,0]nonane-7,9-dione [I; R=H,

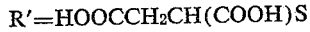

R"=CH₃, Y and Y'=H] in the form of its trisodium salt.

The compounds of Formula II, which serve as intermediates in the preparation of compounds I, are prepared according to the following equations:

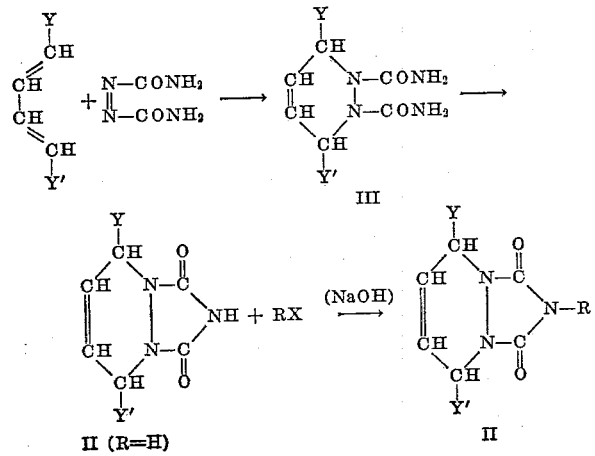

An alkadiene having conjugated double bonds is reacted with azodicarboxamide to give a 1,2-dicarbamyl-1,2,3,6-tetrahydropyridazine (III). Among the alkadienes which can be employed are 1,3-butadiene, 1,3-pentadiene, 2,4-hexadiene, 3,5-octadiene, 2,7-dimethyl-3,5-octadiene, 5,7-dodecadiene, and the like. Pyrolysis of the compound of Formula III gives a compound of Formula II (R=H) which can then be alkylated in the alkali metal salt form with an alkylating agent, RX, wherein X is the anion of a strong acid such as chloride, bromide, iodide, sulfate, and the like. The 1,2-dicarbamyl-1,2,3,6-tetrahydropyridazines of Formula III are disclosed and claimed in the copending application of W. T. Hunter, Serial No. 514,688, filed June 10, 1955. The intermediates of Formula II are disclosed and claimed in the copending application of R. L. Clarke, Serial No. 514,686, filed June 10, 1955.

Illustrative of the compounds of Formula II are the following: 1,6,8-triazabicyclo[4,3,0]-3-nonene-7,9-dione; 2,5 - dimethyl - 1,6,8 - triazabicyclo[4,3,0]-3-nonene-7,9-dione; 2,5 - dipropyl - 1,6,8-triazabicyclo[4,3,0]-3-nonene-7,9-dione; 8-methyl-1,6,8-triazabicyclo[4,3,0]-3-nonene-7,9-dione; 2,5,8-trimethyl-1,6,8-triazabicyclo[4,3,0]-3-nonene-7,9-dione; 8-cyclopentyl-1,6,8-triazabicyclo[4,3,0]-3-nonene-7,9-dione; 8-cyclohexylmethyl-1,6,8-triazabicyclo[4,3,0]-3-nonene-7,9-dione; 8-benzyl-1,6,8-triazabicyclo[4,3,0]-3-nonene-7,9-dione; 8-(2-phenylethyl)-1,6,8-triazabicyclo[4,3,0]-3-nonene-7,9-dione; 8-(p-chlorobenzyl)-1,6,8-triazabicyclo[4,3,0]-3-nonene-7,9-dione; 8-carboxymethyl - 1,6,8 - triazabicyclo[4,3,0] - 3-nonene-7,9-dione; 8-(m-methoxybenzyl)-1,6,8-triazabicyclo[4,3,0]-3-nonene-7,9-dione; 8 - (2,3-dihydroxypropyl) - 1,6,8-triazabicyclo-[4,3,0]-3-nonene-7,9-dione; 8-(1,2-dicarboxyethyl)-1,6,8-triazabicyclo[4,3,0]-3-nonene-7,9-dione; 8-(2-carbomethoxyethyl) - 1,6,8-triazabicyclo[4,3,0]-3-nonene-7,9-dione, and the like.

The compounds of Formula I which are acidic in character, i. e., those in which R is hydrogen or wherein the group R and/or R' contains acidic groupings such as carboxyl, sulfonyl and the like, can be prepared and used either in the free base form or in the form of salts derived from bases whose cations are relatively innocuous to animal organisms in therapeutic doses of the salts, and these salts are within the purview of the invention. Preferred salts are those whose cations are alkali metal ions, ammonium or substituted ammonium ions, e. g., sodium, potassium, ammonium, diethylammonium, diethanolammonium and the like.

The following examples will further illustrate the invention, without the latter being limited thereto.

PREPARATION OF INTERMEDIATES

*1,2-dicarbamyl-1,2,3,6-tetrahydropyridazine*

[III; Y and Y'=H]

A mixture of 312 g. (2.7 moles) of azodicarboxamide, 750 ml. of dimethylformamide, and 650 ml. of butadiene (mixed in that order) was heated in an autoclave at 100° C. for four hours. The reaction mixture was cooled and the mixture rinsed from the autoclave liner with benzene. The solid product was collected by filtration, washed with n-pentane, and air dried, giving 346 g. of 1,2-dicarbamyl-1,2,3,6-tetrahydropyridazine. A sample when recrystallized twice from water had the M. P. 253–255.5° C.

*Analysis.*—Calcd. for C₆H₁₀N₄O₂: N, 32.92; O, 18.80. Found: N, 32.84; O, 19.20.

Other pyridazines can be produced by repeating the above preparation, observing the same conditions for conducting the process, by substituting a molar equivalent amount of a C₅ to C₁₂ alkadiene for the butadiene therein used. Thus, 1,2-dicarbamyl-3,6-dimethyl-1,2,3,6-tetrahydropyridazine can be obtained with 2,4-hexadiene, by way of illustration.

EXAMPLE 1

(a) *1,6,8-triazabicyclo[4,3,0]-3-nonene-7,9-dione* [II; R=H, Y and Y'=H]

1,2-dicarbamyl-1,2,3,6-tetrahydropyridazine (200 g., 1.19 mole) was heated at 275–285° C. for about thirty minutes. The solid melted with evolution of ammonia in the time specified and evolution of gas substantially ceased. The product was cooled, dissolved in a solution of 47 g. of sodium hydroxide in 500 ml. of water, treated briefly with 10 g. of activated charcoal (Darco G-60) at 50° C., cooled and filtered. The filtrate was acidified with 100 ml. of concentrated hydrochloric acid, the product which separated was collected by filtration and dried, giving 154 g. of 1,6,8-triazabicyclo[4,3,0]-3-nonene-7,9-dione. Two recrystallizations from water gave a sample of the compound in the form of colorless needles, M. P. 244–247° C. (corr.).

*Analysis.*—Calcd. for $C_6H_7N_3O_2$: N, 27.45; O, 20.9. Found: N, 27.35; O, 21.1.

Neut. equiv. calcd.: 153.1. Found: 152.9.

1,6,8-triazabicyclo[4,3,0]-3-nonene-7,9-dione was found to possess diuretic activity approximately equal to that of theophylline when administered to dogs at dose levels of 7.5–30.0 mg./kg. of body weight. No toxic manifestations were observed at any dose level.

By replacement in the above procedure of the 1,2-dicarbamyl-1,2,3,6-tetrahydropyridazine by a molar equivalent amount of 1,2-dicarbamyl,3,6-dimethyl-1,2,3,6-tetrahydropyridazine, there can be obtained 2,5-dimethyl-1,6,8-triazabicyclo[4,3,0]-3-nonene-7,9-dione [II; R=H, Y and Y'=CH₃].

(b) *3-acetoxymercuri-4-methoxy-1,6,8-triazabicyclo[4,3,0]nonane-7,9-dione* [I; R=H, R'=CH₃COO, R''=CH₃, Y and Y'=H]

To a solution of 6.3 g. (0.041 mole) of 1,6,8-triazabicyclo[4,3,0]-3-nonene-7,9-dione dissolved in 150 ml. of boiling methanol was added a filtered solution of mercuric acetate (13.1 g., 0.041 mole) in 50 ml. of boiling methanol. To the resulting mixture was added three drops of concentrated nitric acid, and the mixture was refluxed and stirred for two hours. The reaction mixture was cooled in ice, and the solid product which had separated was collected by filtration and washed several times by decantation with warm water to remove unreacted starting materials. The product was then triturated with absolute alcohol followed by absolute ether, giving 3-acetoxymercuri-4-methoxy-1,6,8-triazabicyclo[4,3,0]nonane-7,9-dione in the form of an amorphous solid.

By replacing in the preparation just described the 1,6,8-triazabicyclo[4,3,0]-3-nonene-7,9-dione by a molar equivalent amount of 2,5-dimethyl-1,6,8-triazabicyclo[4,3,0]-3-nonene-7,9-dione, there can be obtained 2,5-dimethyl-3-acetoxymercuri-4-methoxy-1,6,8-triazabicyclo[4,3,0]nonane-7,9-dione [I; R=H, R'=CH₃COO, R''=CH₃, Y and Y'=CH₃].

By replacing in the preparation just described the methanol by water, ethanol, isopropanol, butanol, ethylene glycol, 2-ethoxyethanol or diethylene glycol, and carrying out the reaction at a temperature between about 20° C. and 150° C., taking into account the boiling point of the medium, there can be obtained, respectively, 3-hydroxymercuri-4-hydroxy-1,6,8-triazabicyclo[4,3,0]nonane-7,9-dione [I; R=H, R'=H, R''=H, Y and Y'=H], 3-acetoxymercuri-4-ethoxy-1,6,8-triazabicyclo[4,3,0]nonane-7,9-dione [R'=CH₃COO, R''=C₂H₅], 3-acetoxymercuri-4-isopropoxy-1,6,8-triazabicyclo[4,3,0]nonane-7,9-dione [R''=(CH₃)₂CH], 3-acetoxymercuri-4-butoxy-1,6,8-triazabicyclo[4,3,0]nonane-7,9-dione [R''=n—C₄H₉], 3-acetoxymercuri-4-(2-hydroxyethoxy)-1,6,8-triazabicyclo[4,3,0]nonane-7,9-dione [R''=HOCH₂CH₂], 3-acetoxymercuri-4-(2-ethoxyethoxy)-1,6,8-triazabicyclo[4,3,0]nonane-7,9-dione [R''=CH₃CH₂OCH₂CH₂], 3-acetoxymercuri-4-[2-(2-hydroxyethoxy)ethoxy]-1,6,8-triazabicyclo[4,3,0]nonane-7,9-dione [R''=HOCH₂CH₂OCH₂CH₂].

3-hydroxymercuri-4-hydroxy-1,6,8-triazabicyclo[4,3,0]-nonane-7,9-dione was obtained in the form of a colorless amorphous solid, M. P. 266.5° C. (dec.) with darkening at 264° C.

*Analysis.*—Calcd. for $C_6H_9HgN_3O_4$: Hg, 51.7; N, 10.84. Found: Hg, 53.0; N, 10.83.

EXAMPLE 2

*3-hydroxymercuri-4-methoxy-1,6,8-triazabicyclo[4,3,0]nonane-7,9-dione* [I; R=H, R'=HO, R''=CH₃, Y and Y'=H]

3-acetoxymercuri-4-methoxy-1,6,8-triazabicyclo[4,3,0]nonane-7,9-dione (89 g., 0.2 mole) was dissolved in 1 liter of 0.2 N sodium hydroxide solution, and the solution was filtered to remove a small amount of insoluble material. The filtrate was cooled and carbon dioxide gas was passed in until precipitation of the product was complete. The product was collected by filtration, washed with water, absolute alcohol and ether, and dried for four hours in vacuo at 60° C., giving 46 g. of 3-hydroxymercuri-4-methoxy-1,6,8-triazabicyclo[4,3,0]nonane-7,9-dione, M. P. 295–300° C. (dec.).

*Analysis.*—Calcd. for $C_7H_{11}HgN_3O_4$: Hg, 49.93; N, 10.46; O,15.93. Found: Hg, 49.95; N, 10.78; O, 15.85.

3-hydroxymercuri-4-methoxy-1,6,8-triazabicyclo[4,3,0]nonane-7,9-dione was found to possess diuretic activity greater than that of o-[(3-hydroxymercuri-2-methoxypropyl)carbamyl]-phenoxyacetic acid (mersalyl free acid) when administered to dogs at dose levels of 0.5–2.0 mg./kg. of body weight. No toxic manifestations were observed at any dose level.

EXAMPLE 3

*3-(carboxymethylthiomercuri)-4-methoxy-1,6,8-triazabicyclo[4,3,0]nonane-7,9-dione* [I; R=H, R'=HOOCCH₂S, R''=CH₃, Y and Y'=H]

Thioglycolic acid (1.84 g., 0.02 mole) was dissolved in 10 ml. of water containing 0.8 g. of sodium hydroxide (0.02 mole), and added to a solution of 8.04 g. (0.02 mole) of 3-hydroxymercuri-4-methoxy-1,6,8-triazabicyclo[4,3,0]nonane-7,9-dione and an equivalent amount of sodium hydroxide in 50 ml. of water. A small amount of insoluble material was removed by filtration, and the filtrate was diluted with 300 ml. of acetone and 200 ml. of isopropyl alcohol. The pale yellow oil which separated was obtained by decantation of the supernatant solution, and the oil was triturated with acetone to give a semi-solid gum. The latter was dissolved in 20 ml. of water, the solution was diluted with 150 ml. of methanol, and a flocculent precipitate was removed by filtration. Further dilution of the filtrate with 300 ml. of isopropyl alcohol and 200 ml. of acetone caused the product to precipitate as a flocculent white powder, which was collected by filtration, dried in vacuo at 60–65° C., ground to a fine powder and further dried in vacuo at 80° C., giving 4.9 g. of 3-(carboxymethylthiomercuri)-4-methoxy-1,6,8-triazabicyclo[4,3,0]nonane-7,9-dione in the form of its disodium salt, M. P. 211–223.5° C. with decomposition at 219° C.

*Analysis.*—Calcd. for $C_9H_{11}HgN_3Na_2O_5S$: Hg, 38.6; N, 808. Found: Hg, 39.0; N, 7.52.

3-(carboxymethylthiomercuri)-4-methoxy-1,6,8-triazobicyclo[4,3,0]nonane-7,9-dione was found to possess diuretic activity greater than that of mercaptomerin sodium (disodium salt of N-(γ-carboxymethylmercapto-mercuri-β-methoxy)propylcamphoramic acid) when administered to dogs at dose levels of 0.5–2.0 mg./kg. of body weight. No toxic manifestations were observed at any dose level.

EXAMPLE 4

3 - (1,2 - dicarboxyethylthiomercuri) - 4 - methoxy - 1,6,8 - triazabicyclo[4,3,0]nonane - 7,9 - dione [I; R=H, R'=HOOCCH$_2$CH(COOH)S, R''=CH$_3$, Y and Y'=H]

To a solution of 0.8 g. (0.02 mole) of sodium hydroxide in 50 ml. of water was added 4.44 g. (0.01 mole) of 3 - acetoxymercuri - 4 - methoxy - 1,6,8 - triazabicyclo[4,3,0]nonane-7,9-dione. The resulting opalescent mixture was filtered and 1.50 g. (0.01 mole) of thiomalic acid dissolved in a solution of 0.08 g. (0.02 mole) of sodium hydroxide in 10 ml. of water was combined with the filtrate. A small amount of insoluble material was removed by filtration, and the filtrate was diluted with 1 liter of acetone and cooled until the product has separated in the form of an oil. The supernatant solution was decanted and the oil was triturated repeatedly with several portions of acetone until a powdery, colorless, amorphous solid was obtained. After drying, there was obtained 3.9 g. of 3 - (1,2 - dicarboxyethylthiomercuri) - 4 - methoxy - 1,6,8 - triazabicyclo[4,3,0]nonane - 7,9 - dione in the form of its trisodium salt, M. P. 120–125° C.

EXAMPLE 5

3 - methylthiomercuri - 4 - methoxy - 1,6,8 - triazabicyclo[4,3,0]nonane - 7,9 - dione [I; R=H, R'=CH$_3$S, R''=CH$_3$, Y and Y'=H]

3 - acetoxymercuri - 4 - methoxy - 1,6,8 - triazabicyclo[4,3,0] nonane - 7,9 - dione (4.44 g., 0.01 mole) was dissolved in 50 ml. of water containing 0.8 g. (0.02 mole) of sodium hydroxide. The resulting cloudy solution was filtered, and a solution of 0.5 g. (0.01 mole) of methyl cercaptan in 15–20 ml. of methanol was added to the filtrate. The reaction mixture was filtered, and the filtrate was diluted with 400 ml. of acetone which caused separation of a crystalline product. The product was collected by filtration and dried, giving 3.0 g. of 3-methylthiomercuri - 4 - methoxy - 1,6,8 - triazabicyclo[4,3,0]nonane - 7,9 - dione in the form of its sodium salt. A sample when recrystallized from ethanol was obtained in the form of colorless platelets, M. P. above 210° C. with decomposition at 178.5° C.

*Analysis.*—Calcd. for C$_8$H$_{12}$HgN$_3$NaO$_3$S: Hg, 44.2; N, 9.26. Found: Hg, 43.3; N, 8.33.

3 - hydroxymercuri - 4 - methoxy - 1,6,8 - triazabicyclo[4,3,0]nonane - 7,9 - dione can be reacted with molar equivalent amounts of β-hydroxypropionic acid, carbethoxymethylmercaptan, serine, monosodium cysteinate, thiosorbitol, or thioglycerol to give, respectively, 3 - (β - hydroxypropionoxymercuri) - 4 - methoxy - 1,6,8-triazabicyclo[4,3,0]nonane - 7,9 - dione

[R'=HOCH$_2$CH$_2$COO]

3 - (carbethoxymethylthiomercuri) - 4 - methoxy - 1,6,8-triazabicyclo[4,3,0]nonane - 7,9 - dione

[R'=C$_2$H$_5$OOCCH$_2$S]

3 - (α - amino - β - hydroxypropionoxymercuri) - 4-methoxy - 1,6,8 - triazabicyclo[4,3,0]nonane - 7,9 - dione [R'=HOCH$_2$CH(NH$_2$)COO]; 3 - (2 - carboxy - 2 - aminoethylthiomercuri) - 4 - methoxy - 1,6,8 - triazabicyclo[4,3,0]nonane - 7,9 - dione

[R'=HOOCCH(NH$_2$)CH$_2$S]

3 - (2,3,4,5,6 - pentahydroxyhexylthiomercuri) - 4 - methoxy - 1,6,8 - triazabicyclo[4,3,0]nonane - 7,9 - dione

[R'=HOCH$_2$CH(OH)CH(OH)CH(OH)CH(OH)CH$_2$S]

or 3 - (2,3 - dihydroxypropylthiomercuri) - 4 - methoxy-1,6,8 - triazabicyclo[4,3,0]nonane - 7,9 - dione

[R'=HOCH$_2$CH(OH)CH$_2$S]

3 - chloromercuri - 4 - methoxy - 1,6,8 - triazabicyclo[4,3,0]nonane - 7,9 - dione [I; R=H, R'=Cl, R''=CH$_3$, Y and Y'=H]; 3 - bromomercuri - 4 - methoxy - 1,6,8 - triazabicyclo[4,3,0]nonane - 7,9 - dione [I; R'=Br]; 3 - iodomercuri - 4 - methoxy - 1,6,8 - triazabicyclo[4,3,0]nonane - 7,9 - dione [I; R'=I]; and sodium 3 - hydrothiosulfatomercuri - 4 -methoxy - 1,6,8 - triazabicyclo[4,3,0]nonane - 7,9 - dione [R'=NaSO$_3$—S] can be prepared by treating a methanolic solution of 3-acetoxymercuri - 4 - methoxy - 1,6,8 - triazabicyclo[4,3,0]nonane - 7,9 - dione with an aqueous solution of sodium chloride, sodium bromide, sodium iodide or sodium thiosulfate, respectively.

EXAMPLE 6

(a) 8 - carbethoxymethyl - 1,6,8 - triazabicyclo[4,3,0]-3 - nonene - 7,9 - dione [II; R=CH$_2$COOC$_2$H$_5$, Y and Y'=H]

To a solution of 50 g. (0.326 mole) of 1,6,8-triazabicyclo[4,3,0]-3-nonene-7,9-dione in 170 ml. of 1.96 N aqueous sodium hydroxide was added a solution of 54.5 g. (0.326 mole) of ethyl bromoacetate in 150 ml. of 95% alcohol. The reaction mixture was refluxed for fifteen hours, the alcohol was removed by warming the mixture in vacuo, and the resulting water-oil mixture was chilled to crystallize the oil. The solid product was collected by filtration and recrystallized from 350 ml. of hot water, using activated charcoal for decolorizing purposes, giving 54.5 g. of colorless needles, M. P. 99–103° C. The latter material was heated with 400 ml. of benzene, the solution filtered to remove 1.7 g. of insoluble material, and the solution concentrated to dryness in vacuo. The residue was recrystallized from 500 ml. of water to give 43 g. of 8 - carbethoxymethyl - 1,6,8 - triazabicyclo[4,3,0] - 3 - nonene - 7,9 - dione, M. P. 102.5–105° C.

*Analysis.*—Calcd. for C$_{10}$H$_{13}$N$_3$O$_4$: C, 50.31; H, 5.43. Found: C, 50.49; H, 5.49.

(b) 3 - acetoxymercuri - 4 - methoxy - 8 - carbethoxymethyl - 1,6,8 - triazabicyclo[4,3,0]nonane - 7,9 - dione [I; R=CH$_2$COOC$_2$H$_5$, R'=CH$_3$COO, R''=CH$_3$, Y and Y'=H]

To a solution of 5.0 g. (0.021 mole) of 8-carbethoxymethyl - 1,6,8 - triazabicyclo[4,3,0] - 3 - nonene - 7,9-dione in 100 ml. of methanol was added all at once a solution of 6.65 g. (0.021 mole) of mercuric acetate in 75 ml. of methanol. Two drops of concentrated nitric acid was then added, and the solution was refluxed for twenty minutes. The reaction mixture was concentrated to dryness in vacuo at below 50° C., the solid residue was dissolved in 35 ml. of hot methanol, and the solution was filtered and cooled. (In some runs the resulting polymorphic product separated as needles which transformed slowly to plates, while in other runs the product precipitated directly as plates.) The product was collected by filtration, giving 6.6 g. of 3 - acetoxymercuri - 4 - methoxy - 8 - carbethoxymethyl - 1,6,8 - triazabicyclo[4,3,0]nonane-7,9-dione, M. P. 181–183.5° C. with softening at about 110–115° C.; it melted immediately when immersed at 140° C.

*Analysis.*—Calcd. for C$_{13}$H$_{19}$HgN$_3$O$_7$: Hg, 37.86; N, 7.93. Found: Hg, 37.85; N, 7.89.

3 - acetoxymercuri - 4 - methoxy - 8 - carbethoxymethyl - 1,6,8 - triazabicyclo[4,3,0]nonane - 7,9 - dione was found to possess diuretic activity greater than that of mersalyl free acid when administered to dogs at dose levels of 0.5–2.0 mg./kg. of body weight.

EXAMPLE 7

(a) 8-carboxymethyl-1,6,8-triazabicyclo[4,3,0]-3-nonene-7,9-dione [II; R=CH$_2$COOH, Y and Y'=H]

A mixture of 25.0 g. (0.105 mole) of 8-carbethoxymethyl - 1,6,8-triazabicyclo[4,3,0]-3-nonene - 7,9 - dione (prepared as described above in Example 6, part a) and 100 ml. of 2 N aqueous hydrochloric acid was heated on a steam bath with frequent stirring until it became homogeneous (about five minutes) and then heated for an additional thirty minutes at 90–95° C. The reaction mixture was cooled and the resulting solid which separated (14.5 g.) was collected by filtration. Evaporation of the filtrate to a 20 ml. volume afforded an additional 5 g. The total material was recrystallized from 50 ml. of water to give 17.8 g. of 8-carboxymethyl-1,6,8-triazabicyclo[4,3,0]-3-nonene-7,9-dione in the form of colorless, massive prisms, M. P. 160–169° C.

*Analysis.*—Calcd. for $C_8H_9N_3O_4$: N, 19.90. Found: N, 19.92.

Neut. equiv. calcd.: 211. Found: 211.

8-carboxymethyl-1,6,8-triazabicyclo[4,3,0]-3-nonene-7,9-dione was found to possess diuretic activity equal to or greater than that of theophylline when administered to dogs at dose levels of 7.5–30.0 mg./kg. of body weight. No toxic manifestations were observed at any of the dose levels.

(b) *4-acetoxymercuri-5-methoxy-8-carboxymethyl-1,6,8-triazabicyclo[4,3,0]nonane-7-9-dione*[I; R=$CH_2COOH$, R'=$CH_3COO$, R''=$CH_3$, Y and Y'=H]

To a solution of 7.15 g. (0.034 mole) of 8-carboxymethyl-1,6,8-triazabicyclo[4,3,0]-3-nonene-7,9-dione and 7.15 g. of potassium acetate in 200 ml. of methanol was added seven drops of concentrated nitric acid followed by a warm solution of 10.8 g. (0.034 mole) of mercuric acetate in 100 ml. of methanol. The resulting clear solution was refluxed for three hours and the solvent was then removed in vacuo at below 50° C. The residue was dissolved in 25 ml. of water, the solution was filtered, and the filtrate allowed to stand at room temperature for about fifteen hours. The solid material which separated was collected by filtration, triturated with water, washed twice with methanol and dried for sixteen hours at 25° C. in vacuo (10 mm.), giving 11.2 g. of 4-acetoxymercuri-5-methoxy-8-carboxymethyl-1,6,8-triazabicyclo[4,3,0]-nonane,-7,9-dione, M. P. 232–235° C. (dec.).

In the preparation just described the potassium acetate was added in order to prevent the formation of an insoluble complex between the 8-carboxymethyl-1,6,8-triazabicyclo[4,3,0]-3-nonene-7,9-dione and the mercuric acetate, probably involving the free carboxy group.

EXAMPLE 8

*4-hydroxymercuri-5-methoxy-8-carboxymethyl-1,6,8-triazabicyclo[4,3,0]nonane-7,9-dione* [I; R=$CH_2COOH$, R'=HO, R''=$CH_3$, Y and Y'=H]

To 11.0 g. of 4-acetoxymercuri-5-methoxy-8-carboxymethyl-1,6,8-triazabicyclo[4,3,0]nonane-7,9-dione (Example 7, part b) suspended in 50 ml. of water was added a solution of 22.4 ml. of 1.96 N sodium hydroxide in 150 ml. of water. The mixture was filtered and concentrated in vacuo at a temperature below 50° C. to a volume of 30 ml. Methanol (250 ml.) was added and the solid material which separated, largely sodium acetate, was removed by filtration. The filtrate was concentrated in vacuo, the residue was taken up in water and the insoluble material was removed by filtration. The filtrate was again concentrated and the residue was recrystallized from 250 ml. of methanol, giving 2.6 g. of 4-hydroxymercuri-5-methoxy-8-carboxy-methyl-1,6,8-triazabicyclo-[4,3,0]nonane-7,9-dione in the form of its sodium salt, M. P. above 225° C. (dec.) with softening at 205–5° C.

*Analysis.*—Calcd. for $C_9H_{12}HgN_3NaO_6$: Hg, 41.6; N, 8.72. Found: Hg, 42.6; N, 9.18.

EXAMPLE 9

(a) *8-methyl-1,6,8-triazabicyclo[4,3,0]-3-nonene-7,9-dione* [II; R=$CH_3$, Y and Y'=H]

To a solution of 21.75 g. (0.142 mole) of 1,6,8-triazabicyclo[4,3,0]-3-nonene-7,9-dione in 76.5 ml. of 1.96 N aqueous sodium hydroxide (0.15 mole) at 25° C. was added 17.9 g. (0.142 mole) of dimethyl sulfate dropwise with stirring over a period of fifteen minutes. The solution was then heated at 95° C. for one and one-quarter hours and cooled. The solid material which separated (17.7 g.) was collected by filtration, giving 15.3 g. of 8-methyl-1,6,8-triazabicyclo[4,3,0]-3-nonene-7,9-dione in the form of heavy needles, M. P. 153–159° C. A sample when recrystallized again from water and then from methanol had the M. P. 155–159° C.

(b) *3-acetoxymercuri-4-methoxy-8-methyl-1,6,8-triazabicyclo[4,3,0]nonane-7,9-dione* [I; R=$CH_3$, R'=$CH_3COO$, R''=$CH_3$, Y and Y'=H]

To a solution of 6.0 g. (0.036 mole) of 8-methyl-1,6,8-triazabicyclo[4,3,0]-3-nonene-7,9-dione in 60 ml. of warm methanol was added a solution of 11.45 g. (0.036 mole) of mercuric acetate in 75 ml. of hot methanol. Six drops of concentrated nitric acid was then added, and the solution was refluxed for fifteen minutes. The reaction mixture was concentrated to a volume of 90 ml., and the solid material which separated upon cooling was collected by filtration, giving 14.3 g. of 3-acetoxymercuri-4-methoxy-8-methyl-1,6,8-triazabicyclo[4,3,0]nonane-7,9-dione, which when recrystallized from 100 ml. of methanol had the M. P. 188–191° C. (dec.).

*Analysis.*—Calcd. for $C_{10}H_{15}HgN_3O_5$: Hg, 43.8; N, 9.18. Found: Hg, 43.6; N, 9.24.

3-acetoxymercuri-4-methoxy-8-methyl-1,6,8-triazabicyclo[4,3,0]nonane-7,9-dione was found to possess diuretic activity greater than that of mersalyl free acid when administered to dogs at dose levels of 0.5–2.0 mg./kg. of body weight. No toxic manifestations were observed at any of the dose levels.

EXAMPLE 10

(a) *8-(2-hydroxyethyl)-1,6,8-triazabicyclo[4,3,0]-3-nonene-7,9-dione* [II; R=$CH_2CH_2OH$, Y and Y'=H]

A solution of 10.0 g. (0.065 mole) of 1,6,8-triazabicyclo[4,3,0]-3-nonene-7,9-dione in 34 ml. of 2 N aqueous sodium hydroxide was concentrated to dryness on a steam bath in vacuo. Ethylene bromohydrin (25 g.) was then added, and the mixture was refluxed for one and one-half hours. The reaction mixture was cooled, diluted with some alcohol and ether, and the solid material which separated was collected by filtration and recrystallized from water to give 5.7 g. of 8-(2-hydroxyethyl)-1,6,8-triazabicyclo[4,3,0]-3-nonene-7,9-dione, M. P. 158–165° C. A sample when recrystallized first from dilute sodium hydroxide and then from water was obtained in the form of colorless, massive prisms, M. P. 162–167.5° C.

*Analysis.*—Calcd. for $C_8H_{11}N_3O_3$; N, 21.31; O, 24.34. Found: N, 21.54; O, 24.50.

(b) *Acetoxymercuri-4-methoxy-8-(2-hydroxyethyl)-1,6,8-triazabicyclo[4,3,0]nonane-7,9-dione* [I; R=$CH_2CH_2OH$, R'=$CH_3COO$, R''=$CH_3$, Y and Y'=H]

can be prepared by reacting 8-(2-hydroxyethyl)-1,6,8-triazabicyclo[4,3,0]-3-nonene-7,9-dione with mercuric acetate in methanol solution according to the manipulative procedure described above in Example 9, part (b).

EXAMPLE 11

(a) *8-dodecyl-1,6,8-triazabicyclo[4,3,0]-3-nonene-7,9-dione* [II; R=$C_{12}H_{25}$, Y and Y'=H]

A solution of 19.2 g. (0.126 mole) of 1,6,8-triazabicyclo[4,3,0]-3-nonene-7,9-dione in 70 ml. of 2 N aqueous sodium hydroxide was concentrated to dryness on a steam bath in vacuo. The residue was dissolved in 60 ml. of dimethylformamide with warming, 40 g. (0.016 mole) of dodecyl bromide was added, and the reaction mixture was refluxed for three hours. The mixture was then cooled, 100 ml. of water was added, and the mixture was stirred until the oily layer had solidified. The solid material was collected by filtration and dissolved in 100 ml. of methanol. Water was added to the solution at 60° C. to the point of turbidity and the solution allowed to cool. The solid material which separated (18.2 g.) was recrystallized from 40 ml. of methanol, giving 15.6 g. of 8-dodecyl - 1,6,8-triazabicyclo[4,3,0]-3-nonene-7,9-dione in the form of needles, M. P. 42–47° C. A sample when recrystallized again from methanol had the M. P. 44.5–45.5° C.

Analysis.—Calcd. for $C_{18}H_{31}N_3O_2$: N, 13.07; O, 9.95; C, 67.24; H, 9.72. Found: N, 12.90; O, 10.08; C, 67.68; H, 9.68.

(b) *3 - acetoxymercuri - 4 - methoxy - 8 - dodecyl - 1,6,8-triazabicyclo-[4,3,0]nonane-7,9-dione* [I; R=$C_{12}H_{25}$, R′=$CH_3COO$, R″=$CH_3$, Y and Y′=H]

can be prepared by reacting 8-dodecyl-1,6,8-triazabicyclo-[4,3,0]-3-nonene-7,9-dione with mercuric acetate in methanol solution according to the manipulative procedure described above in Example 9, part (b).

EXAMPLE 12

(a) *8 - (p - nitrobenzyl) - 1,6,8-triazabicyclo[4,3,0]-3-nonene-7,9-dione* [II; R=$CH_2C_6H_4NO_2$-p, Y and Y′=H]

To a solution of 20 g. (0.013 mole) of 1,6,8-triazabicyclo[4,3,0]-3-nonene-7,9-dione in 65 ml. of 2 N aqueous sodium hydroxide was added 100 ml. of ethanol and 22.4 g. of p-nitrobenzyl chloride. The reaction mixture was refluxed for five hours, cooled, and the solid material which separated was collected by filtration and recrystallized from 400 ml. of ethyl acetate, using activated charcoal for decolorizing purposes. There was thus obtained 22.7 g. of 8-(p-nitrobenzyl)-1,6,8-triazabicyclo[4,3,0]-3-nonene-7,9-dione in the form of colorless needles, M. P. 200–202.5° C.

Analysis.—Calcd. for $C_{13}H_{12}N_4O_4$: N, 19.43; O, 22.20. Found: N, 19.53; O, 21.80.

(b) *3 - acetoxymercuri - 4 - methoxy - 8 - (p - nitrobenzyl)-1,6,8-triazabicyclo[4,3,0]nonane-7,9-dione* [I; R=$CH_2C_6H_4NO_2$-p, R′=$CH_3COO$, R″=$CH_3$, Y and Y′=H]

can be prepared by reacting 8-(p-nitrobenzyl)-1,6,8-triazabicyclo[4,3,0]-3-nonene-7,9-dione with mercuric acetate in methanol solution according to the manipulative procedure described above in Example 9, part (b).

8-cyclohexyl-1,6,8-triazabicyclo[4,3,0]-3-nonene-7,9-dione [II; R=$C_6H_{11}$, Y and Y′=H] can be prepared by reacting 1,6,8-triazabicyclo[4,3,0]-3-nonene-7,9-dione in sodium hydroxide solution with a molar equivalent amount of cyclohexyl bromide according to the manipulative procedure described above in Example 10, part (a). 3-acetoxymercuri-4-methoxy - 8 - cyclohexyl-1,6,8-triazabicyclo-[4,3,0]nonane - 7,9 - dione [I; R=$C_6H_{11}$, R′=$CH_3COO$, R″=$CH_3$, Y and Y′=H] can be prepared by reacting 8-cyclohexyl - 1,6,8-triazabicyclo[4,3,0]-3-nonene-7,9-dione with mercuric acetate in methanol solution according to the manipulative procedure described above in Example 9, part (b).

8 - (2,3,4-trihydroxybutyl)-1,6,8-triazabicyclo[4,3,0]-3-nonene-7,9-dione [II; R=$CH_2CH(OH)CH(OH)CH_2OH$, Y and Y′=H] can be prepared by reacting 1,6,8-triazabicyclo[4,3,0]-3-nonene - 7,9 - dione in sodium hydroxide solution with 2,3,4-trihydroxybutyl chloride according to the manipulative procedure described above in Example 10, part (a). 3-acetoxymercuri-4-methoxy-8-(2,3,4-trihydroxybutyl) - 1,6,8 - triazabicyclo[4,3,0]nonane-7,9-dione [I; R=$CH_2CH(OH)CH(OH)CH_2OH$, R′=$CH_3COO$, R″=$CH_3$, Y and Y′=H] can be prepared by reacting 8-(2,3,4-trihydroxybutyl) - 1,6,8 - triazabicyclo[4,3,0]-3-nonene-7,9-dione with mercuric acetate in methanol solution according to the manipulative procedure described above in Example 9, part (b).

We claim:

1. A compound selected from the group consisting of 8 - R - 3 - R′Hg - 4 - R″O - 1,6,8 - triazabicyclo[4,3,0]-nonane-7,9-diones wherein R is a member of the group consisting of hydrogen, an alkali metal, and the non-toxic organic portion of an alkylating agent having a molecular weight less than about 300, R′ is a non-toxic anion, and R″ is a member of the group consisting of hydrogen, lower-alkyl, hydroxy-lower-alkyl, lower-alkoxy-lower-alkyl, and hydroxy-lower-alkoxy-lower-alkyl groups; and non-toxic salts of acidic members thereof.

2. An 8 - R - 3 - R′Hg - 4 - R″O - 1,6,8 - triazabicyclo-[4,3,0]-nonane-7,9-dione wherein R is hydrogen, R′ is a non-toxic anion, and R″ is a lower-alkyl group.

3. An 8 - R - 3 - R′Hg - 4 - R″O - 1,6,8 - triazabicyclo-[4,3,0]-nonane-7,9-dione wherein R is a carbo-lower-alkoxy-lower-alkyl-group, R′ is a non-toxic anion, and R″ is a lower-alkyl group.

4. An 8 - R - 3 - R′Hg - 4 - R″O - 1,6,8 - triazabicyclo-[4,3,0]-nonane-7,9-dione wherein R is a lower-alkyl group, R′ is a non-toxic anion, and R″ is a lower-alkyl group.

5. 3 - hydroxymercuri - 4 - methoxy - 1,6,8 - triazabicyclo[4,3,0]nonane-7,9-dione.

6. A 3 - (carboxy - lower - alkylthiomercuri) - 4 - methoxy - 1,6,8 - triazabicyclo[4,3,0]nonane - 7,9 - dione.

7. 3 - (carboxymethylthiomercuri) - 4 - methoxy-1,6,8-triazabicyclo[4,3,0]nonane-7,9-dione.

8. A 3 - (lower - acyloxymercuri) - 4 - methoxy - 8 - carbo - lower - alkoxy - lower - alkyl - 1,6,8 - triazabicyclo[4,3,0]nonane - 7,9 - dione.

9. 3 - acetoxymercuri - 4 - methoxy - 8 - carbethoxymethyl - 1,6,8 - triazabicyclo[4,3,0]nonane - 7,9 - dione.

10. A 3 - lower - acyloxymercuri - 4 - methoxy - 8 - lower - alkyl - 1,6,8 - triazabicyclo[4,3,0]nonane - 7,9 - dione.

11. 3 - acetoxymercuri - 4 - methoxy - 8 - methyl - 1,6,8 - triazabicyclo[4,3,0]nonane - 7,9 - dione.

12. The process for preparing an 8-R-3-R′Hg-4-R″O-1,6,8-triazabicyclo[4,3,0]nonane-7,9-dione wherein R is a member of the group consisting of hydrogen and the non-toxic organic portion of an alkylating agent having a molecular weight less than about 300, R′ is a non-toxic anion, and R″ is a member of the group consisting of hydrogen, lower-alkyl, hydroxy-lower-alkyl, lower-alkoxy-lower-alkyl, and hydroxy-lower-alkoxy-lower-alkyl groups, which comprises reacting an 8-R-1,6,8-triazabicyclo[4,3,0] 3-nonene-7,9-dione with a mercuric salt and a member of the group consisting of water, lower-alkanols, hydroxy-lower-alkanols, lower-alkoxy-lower-alkanols, and hydroxy-lower-alkoxy-lower-alkanols, said mercuric salt being at least partially soluble in the reaction medium.

13. The process according to claim 12 in which the mercuric salt is mercuric acetate thus producing a compound wherein R′ is acetoxy.

14. The process according to claim 13 in which the product formed therein is subsequently hydrolyzed to give a compound wherein R′ is hydroxy.

15. The process according to claim 14 in which the product formed therein wherein R′ is hydroxy is subsequently reacted with a thiol derivative selected from the group consisting of lower-alkylmercaptans and lower-alkylmercaptans substituted by from 1 to 3 substituents selected from the group consisting of hydroxy, carboxy, carboalkoxy and amino to give a compound wherein R′ is selected from the group consisting of lower-alkylthio and lower-alkylthio groups substituted by from 1 to 3 substituents selected from the groups consisting of hydroxy, carboxy, carboalkoxy and amino.

16. The process according to claim 14 wherein R is hydrogen, and R″ is methyl.

17. A non-toxic salt of 3-(carboxymethylthiomercuri)-4-methoxy-1,6,8-triazabicyclo[4,3,0]nonane-7,9-dione.

18. A sodium salt of 3-(carboxymethylthiomercuri)-4-methoxy-1,6,8-triazabicyclo[4,3,0]nonane-7,9-dione.

No references cited.